US012354220B2

(12) United States Patent
Malhotra et al.

(10) Patent No.: US 12,354,220 B2
(45) Date of Patent: Jul. 8, 2025

(54) VOLUMETRIC DATA PROCESSING USING A FLAT FILE FORMAT

(71) Applicant: Unity Technologies ApS, Copenhagen (DK)

(72) Inventors: Shrey Malhotra, Foster City, CA (US); Andriy Andy Chmilenko, Mississauga (CA); Adam Myhill, Mayne Island (CA)

(73) Assignee: Unity Technologies ApS, Copenhagen (DK)

( * ) Notice: Subject to any disclaimer, the term of this patent is extended or adjusted under 35 U.S.C. 154(b) by 97 days.

(21) Appl. No.: 17/849,295

(22) Filed: Jun. 24, 2022

(65) Prior Publication Data

US 2022/0414984 A1 Dec. 29, 2022

Related U.S. Application Data

(60) Provisional application No. 63/214,691, filed on Jun. 24, 2021.

(51) Int. Cl.
*G06T 17/10* (2006.01)
*G06T 15/00* (2011.01)
*G06T 15/08* (2011.01)

(52) U.S. Cl.
CPC .......... *G06T 17/10* (2013.01); *G06T 15/005* (2013.01); *G06T 15/08* (2013.01)

(58) Field of Classification Search
CPC ........ G06T 17/10; G06T 15/005; G06T 15/08
See application file for complete search history.

(56) References Cited

U.S. PATENT DOCUMENTS

| 9,852,218 | B1 * | 12/2017 | Epstein | ............ | H04N 21/41407 |
| 2003/0147480 | A1 * | 8/2003 | Richards | .............. | H04B 1/7183 |
| | | | | | 375/343 |
| 2006/0095949 | A1 * | 5/2006 | Whish-Wilson | ... | H04N 1/00204 |
| | | | | | 725/105 |
| 2009/0091571 | A1 * | 4/2009 | Zalewski | ........... | G06Q 30/0244 |
| | | | | | 705/14.1 |
| 2014/0204102 | A1 * | 7/2014 | Rath | ..................... | G06F 9/4401 |
| | | | | | 345/522 |
| 2016/0140689 | A1 * | 5/2016 | Lux | ...................... | H04N 19/136 |
| | | | | | 345/428 |

(Continued)

FOREIGN PATENT DOCUMENTS

WO WO-2022269077 A1 12/2022

OTHER PUBLICATIONS

"International Application Serial No. PCT/EP2022/067431, International Search Report mailed Oct. 17, 2022", 4 pgs.

(Continued)

*Primary Examiner* — Yi Yang
(74) *Attorney, Agent, or Firm* — Schwegman Lundberg & Woessner, P.A.

(57) ABSTRACT

A system and a method of volumetric data processing include receiving volumetric data corresponding to a digital asset, the digital asset including a plurality of frames; creating a file to represent the volumetric data in a flat file format, the flat file format representing the plurality of frames arranged in a plurality of buffers in the file, each of the plurality of buffers being assigned with a fixed number of frames; and providing the file to a client device for a rendering of the digital asset.

17 Claims, 12 Drawing Sheets

(56) References Cited

U.S. PATENT DOCUMENTS

2019/0004808 A1\* 1/2019 Larson .................. G06F 9/3851
2020/0098140 A1\* 3/2020 Jagnow ................. G06T 19/006

OTHER PUBLICATIONS

"International Application Serial No. PCT/EP2022/067431, Written Opinion mailed Oct. 17, 2022", 8 pgs.

Lee, Kyungjin, et al., "GROOT a real-time streaming system of high-fidelity volumetric videos", Proceedings of the 33rd Annual ACM Symposium on User Interface Software and Technology, ACMPUB27, New York, NY, USA, (Sep. 21, 2020), 1-14.

Markus, Schuetz, et al., "Potree: Rendering Large Point Clouds in Web Browsers Diplom-Ingenieur in Visual Computing (thesis)", [Online]. Retrieved from the Internet: <URL: https://publik.tuwien.ac.at/files/publik_252607.pdf>, (Sep. 19, 2016), 92 pgs.

International Application Serial No. PCT/EP2022/067431, International Preliminary Report on Patentability mailed Jan. 4, 2024, 10 pgs.

\* cited by examiner

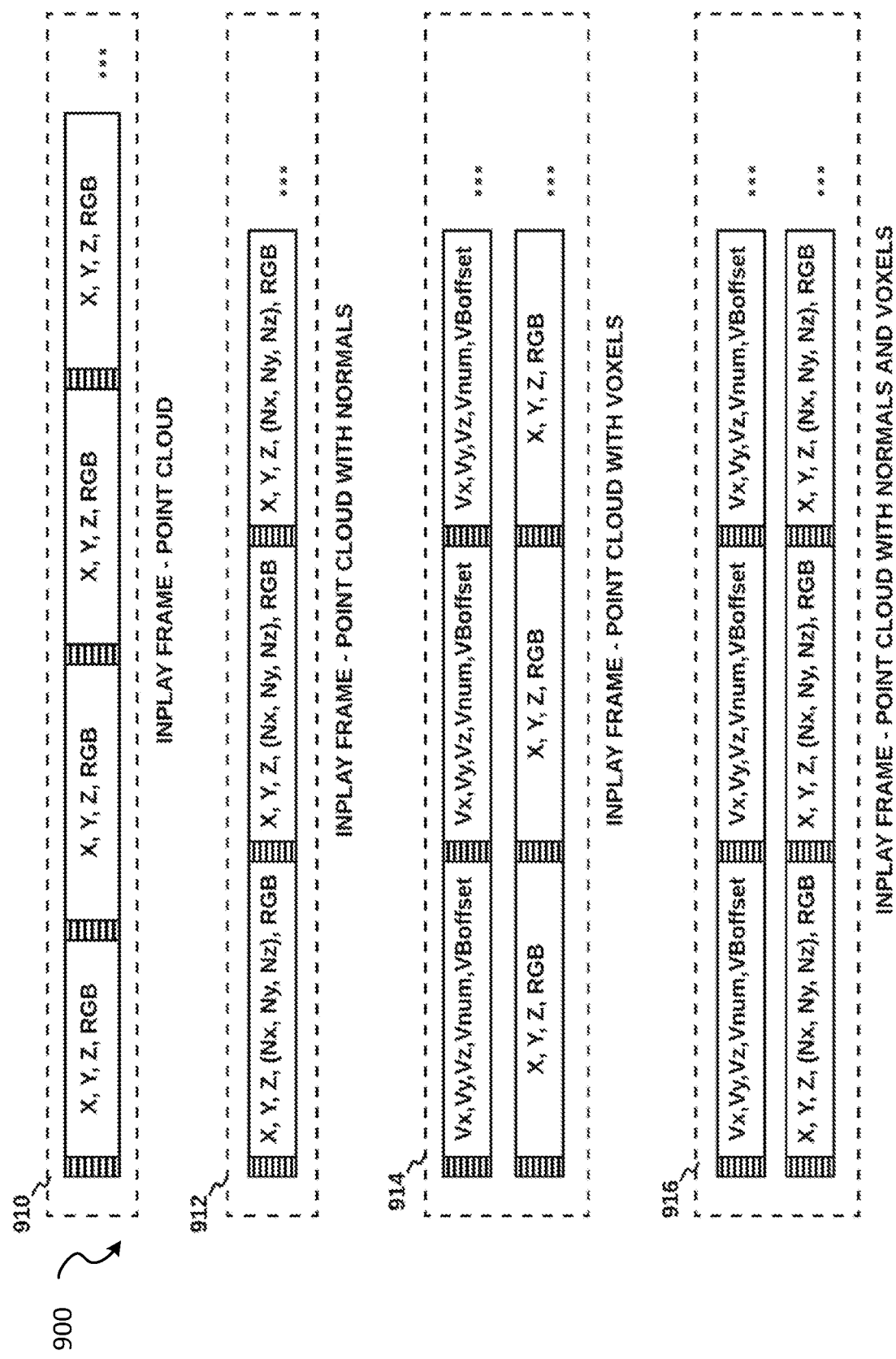

VOLUMETRIC DATA PROCESSING USING A FLAT FILE FORMAT

CROSS-REFERENCE TO RELATED APPLICATIONS

This application claims the benefit of U.S. Provisional Application No. 63/214,691, filed Jun. 24, 2021, entitled "VOLUMETRIC DATA PROCESSING USING A FLAT FILE FORMAT," which is hereby incorporated by reference herein in its entirety.

TECHNICAL FIELD

The subject matter disclosed herein generally relates to the technical field of computer graphics, and in one specific example, to computer systems and methods for real-time volumetric rendering using a specialized data structure in computer programs.

BACKGROUND OF THE INVENTION

Volume rendering refers to a set of techniques used to display a 2D projection based on discretely sampled 3D datasets, such as volumetric data. Volumetric data is typically represented in different file formats, such as formats corresponding to a set of vertices and color-based, or voxel-based hierarchical structures. Processing volumetric data in different file formats for volume rendering suffers from a large overhead of computing resources. The large overhead causes unbalanced allocations in memory, which makes it computationally expensive and time-consuming, especially when attempting to meet the needs of real-time volume rendering in 3D computer games.

BRIEF DESCRIPTION OF THE DRAWINGS

Features and advantages of example embodiments of the present disclosure will become apparent from the following detailed description, taken in combination with the appended drawings, in which:

FIG. 9A and FIG. 9B depict block diagrams illustrating examples of volumetric frames, in accordance with one embodiment;

DETAILED DESCRIPTIONS

Figure 1:
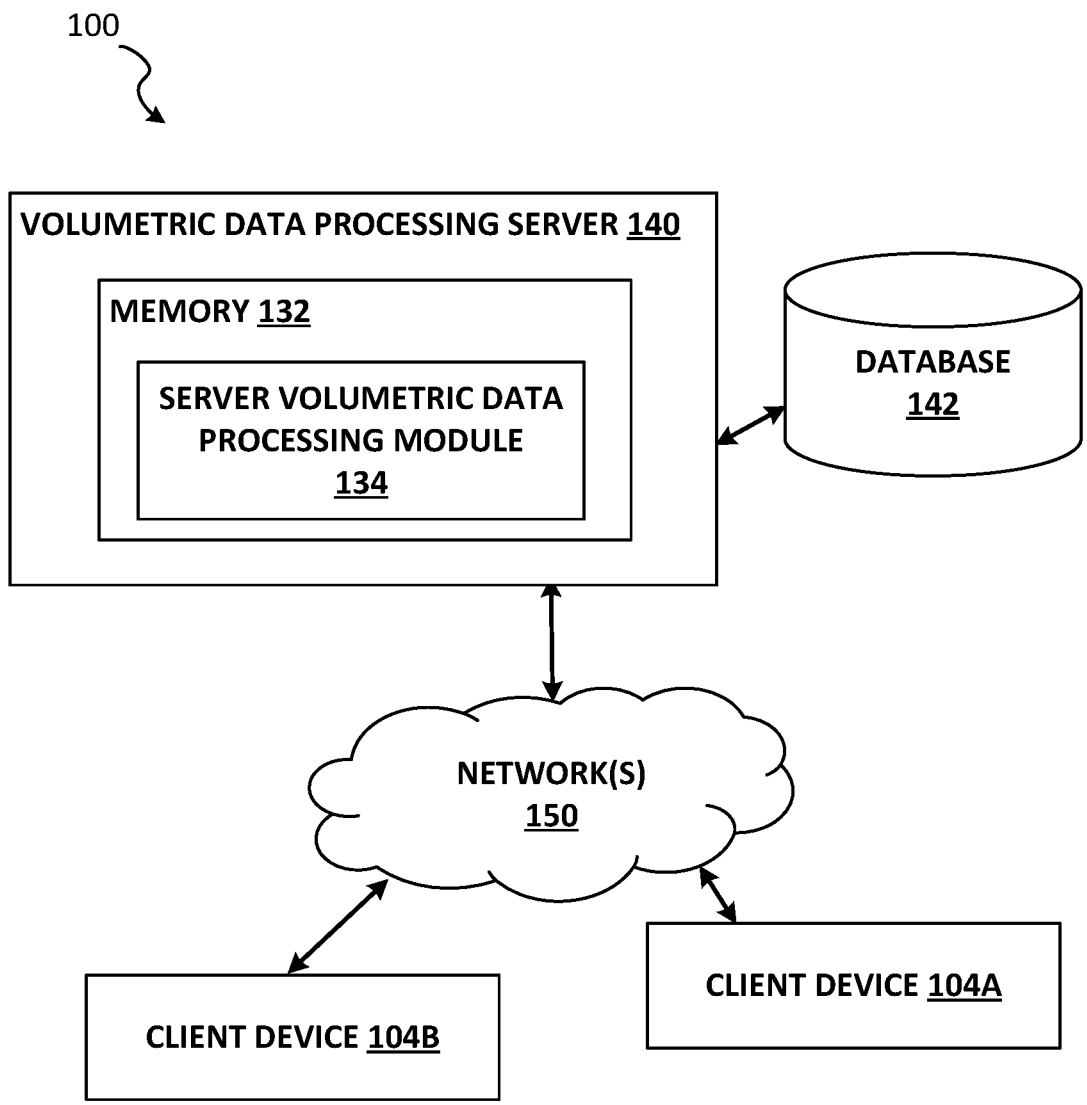
FIG. 1 is a diagrammatic representation of a volumetric data processing system, in accordance with one embodiment.

The description that follows describes example systems, methods, techniques, instruction sequences, and computing machine program products that comprise illustrative embodiments of the disclosure, individually or in combination. In the following description, for the purposes of explanation, numerous specific details are set forth in order to provide an understanding of various embodiments of the inventive subject matter. It will be evident, however, to those skilled in the art, that various embodiments of the inventive subject matter may be practiced without these specific details.

The term 'digital content' or 'content' used throughout the description herein should be understood to include all forms of media, including images, videos (e.g., movies), audio, video games, text, 3D models (e.g., including textures, materials, meshes, and more), animations, vector graphics, and the like.

The term 'video game' or 'game' used throughout the description herein should be understood to include video games and applications that execute and present video games on a device, and applications that execute and present simulations on a device. The term 'game' should also be understood to include programming code (either source code or executable binary code) which is used to create and execute the game on a device, such as a user device or a client device.

The term 'environment' used throughout the description herein should be understood to include 2D digital environments (e.g., 2D video game environments, 2D simulation environments, 2D content creation environments, and the like), 3D digital environments (e.g., 3D game environments, 3D simulation environments, 3D content creation environment, virtual reality environments, and the like), and augmented reality environments that include both a digital (e.g., virtual) component and a real-world component.

The term 'digital object', used throughout the description herein, is understood to include any object of digital nature, digital structure, or digital element within an environment. A digital object can represent (e.g., in a corresponding data structure) almost anything within the environment; including 3D models (e.g., characters, weapons, scene elements (e.g., buildings, trees, cars, treasures, and the like)) with 3D model textures, backgrounds (e.g., terrain, sky, and the like), lights, cameras, effects (e.g., sound and visual), animation, and more. The term 'digital object' may also be understood to include linked groups of individual digital objects. A digital object is associated with data that describes properties and behavior for the object.

The terms 'asset', 'game asset', and 'digital asset', used throughout the description herein are understood to include any data that can be used to describe a digital object or can be used to describe an aspect of a digital project (e.g., including a game, a film, or a software application). For example, an asset can include data for an image, a 3D model (textures, rigging, and the like), a group of 3D models (e.g., an entire scene), an audio sound, a video, animation, a 3D mesh and the like. The data describing an asset may be stored within a data structure (e.g., a file), or may be contained within a collection of data structures (e.g., files), or may be compressed and stored in one data structure (e.g., a compressed file), each of which may be stored within a memory. The data describing an asset can be used to instantiate one or more digital objects within a game at runtime (e.g., during execution of the game).

The term 'build' and 'game build' used throughout the description herein should be understood to include a compiled binary code of a game which can be executed on a device, and which, when executed can provide a playable version of the game (e.g., playable by a human or by an artificial intelligence agent).

The terms 'client' and 'application client' used throughout the description herein are understood to include a software client or software application that can access data and services on a server, including accessing over a network.

A method of volumetric data processing and rendering is disclosed herein. Volumetric data includes discretely sampled 3D datasets, such as volumetric sequences of Point Cloud datasets, or volumetric sequences of mesh or texture-based datasets. Volumetric data may be represented in different data formats (e.g., file formats), corresponding to vertices and color-based or voxel-based hierarchical structures. Due to typically large data sets required to represent a scene in volumetric data, volumetric data processing suffers from a large overhead of computing resources, making it difficult or virtually impossible to render digital assets therein in real-time without decimating the volumetric sequence. Additional overhead of computing resources may arise when attempting to process volumetric data from different source formats.

The disclosed volumetric data processing system and method provides a simple, flexible and flat approach to process volumetric datasets and render the associated digital assets at real-time speeds. Specifically, the disclosed system and method provide an efficient way of representing volumetric data in a flat format, agnostic to a source format in which the volumetric data may have been captured or streamed. Using the disclosed volumetric data processing system and method described herein, this flat format allows for real-time playback of the associated digital assets and allows for seeking and rendering of volumetric frames stored in a volumetric sequence without additional memory allocations during points parsing (e.g., unpacking or deserializing). The flat format is a custom archive format that may unify and carry any custom format data through a volumetric pipeline for real-time rendering of digital assets.

In one embodiment, the volumetric data processing system comprises a pre-processor unit acting as a format converter to convert source formats of the volumetric data into a unified data structure, represented by the flat format as discussed herein. For example, the pre-processor unit creates a file (e.g., Inplay file) in the flat file format (e.g., Inplay file format), representing the volumetric data from various source file formats as the volumetric data is streamed in. In the created file, volumetric frames in the volumetric data are arranged in a set of pre-allocated buffers. Each of the buffers may be assigned with a predetermined number of volumetric frames. For example, a file in the flat file format may include 4 buffers and 60 frames (e.g., volumetric frames) in each buffer. In one embodiment, the number of frames arranged in each buffer is a constant number, corresponding to a constant numerical or text value. The constant number of frames in each buffer may be used to identify the flat file format. In one embodiment, the predetermined number of frames is determined based on a frame rate of the volumetric data. For example, based on a frame rate of 90 frames per second, the number of volumetric frames per buffer may be 90. Volumetric data in the Inplay file format may be referred to herein as 'packed volumetric data'.

In accordance with an embodiment, it should be understood that while the description herein refers to an Inplay file (e.g., a creation of an inplay file, distribution of an inplay file, and a reading of data from an inplay file), the data therein need not be structured as a file (e.g., with file encoding). The inplay file as referenced herein should be understood to include data structured with the described inplay file format structure without necessarily being packaged within a file. For example, the inplay file may refer to data in memory structured with the inplay file format.

In one embodiment, the volumetric data processing system allows coherent processing and rendering of the volumetric data (e.g., whereby the volumetric data is in the Inplay file format as described herein). The packed volumetric data may be drawn procedurally on a graphics processing unit (GPU). The volumetric data processing system may utilize parallel computational units on the GPU to process (e.g., decode and unpack) the volumetric frames from the volumetric data. The volumetric data processing system additionally instructs the GPU to use the processed data without requiring additional operations performed by a central processing unit (CPU). For example, when streaming in, the original volumetric data may be drawn procedurally to the GPU (e.g., drawn using a compute buffer but without using a vertex buffer or index buffer). Accordingly, the geometry is read from the compute buffer to generate data on the GPU, without requiring a readback to the CPU. The original volumetric data for each point may be packed or coded in the flat file format comprising the form of "XYZRGB", "XYZRGBA" or "XYZNXNYNZRGBA" for the GPU to decode. The flat file format may consist of geometric data (e.g., positional x, y, and z values represented herein as "XYZ") for a point followed by color data (e.g., red, green, and blue values represented herein as "RGB" or "RGBA" which includes an alpha value) for the point. The flat file format may also include normal values (e.g., represented herein as "NXNYNZ" comprising a normal value for the X, Y, and Z directions, respectively) for each point. The GPU may read the original volumetric data from a disk (e.g., from a read only memory (ROM), a random access memory (RAM)) without modification or unpacking of the data by the CPU. Accordingly, there may be no CPU resource allocation during the operations of deserialization. Such coherent processing and rendering operations (e.g., wherein the GPU reads data without CPU processing of the data) reduce processing overhead by reducing or eliminating the movement of data between the CPU and the GPU (e.g., copying data back and forth between the the CPU and GPU), and by avoiding additional processing of the data by the CPU. This avoids unnecessary delays and overhead of computing resources. In one embodiment, the volumetric data processing system utilizes a custom rendering program (e.g., shader or compute shader) to instantiate splats (or geometry) at every point of the given volumetric data. If the packed point data in the originally received volumetric data (e.g., raw volumetric data) includes color and normal information, the volumetric data processing system may transfer such information to the custom rendering program for rendering.

FIG. 1 is a diagrammatic representation of a volumetric data processing system 100 and associated devices configured to provide volumetric data processing functionality. In one embodiment, the volumetric data processing system 100 includes a volumetric data processing server 140, a database 142, a network 150, a user device 104A, and a user device 104B. The volumetric data processing server is communicatively coupled to the database 142 that may store volumetric data, and communicatively coupled to the user devices 104A and 104B via the network 150 (e.g., a cellular network, a Wi-Fi network, the Internet, and so forth). In some embodiments there may be a single user device 104, while in other embodiments there may be a plurality of user devices. In some embodiments, the user device 104 is a mobile computing device, such as a smartphone, a tablet computer, a laptop computer, a head-mounted virtual reality (VR) device, or a head-mounted augmented reality (AR) device capable of providing a digital environment to a user. In other embodiments, the user device 104 is a computing device such as a desktop computer capable of providing a digital environment to a user. The volumetric data processing server 140 may comprise one or more central processing units (CPUs) (not shown) and graphics processing units (GPUs) (not shown).

Figure 2:
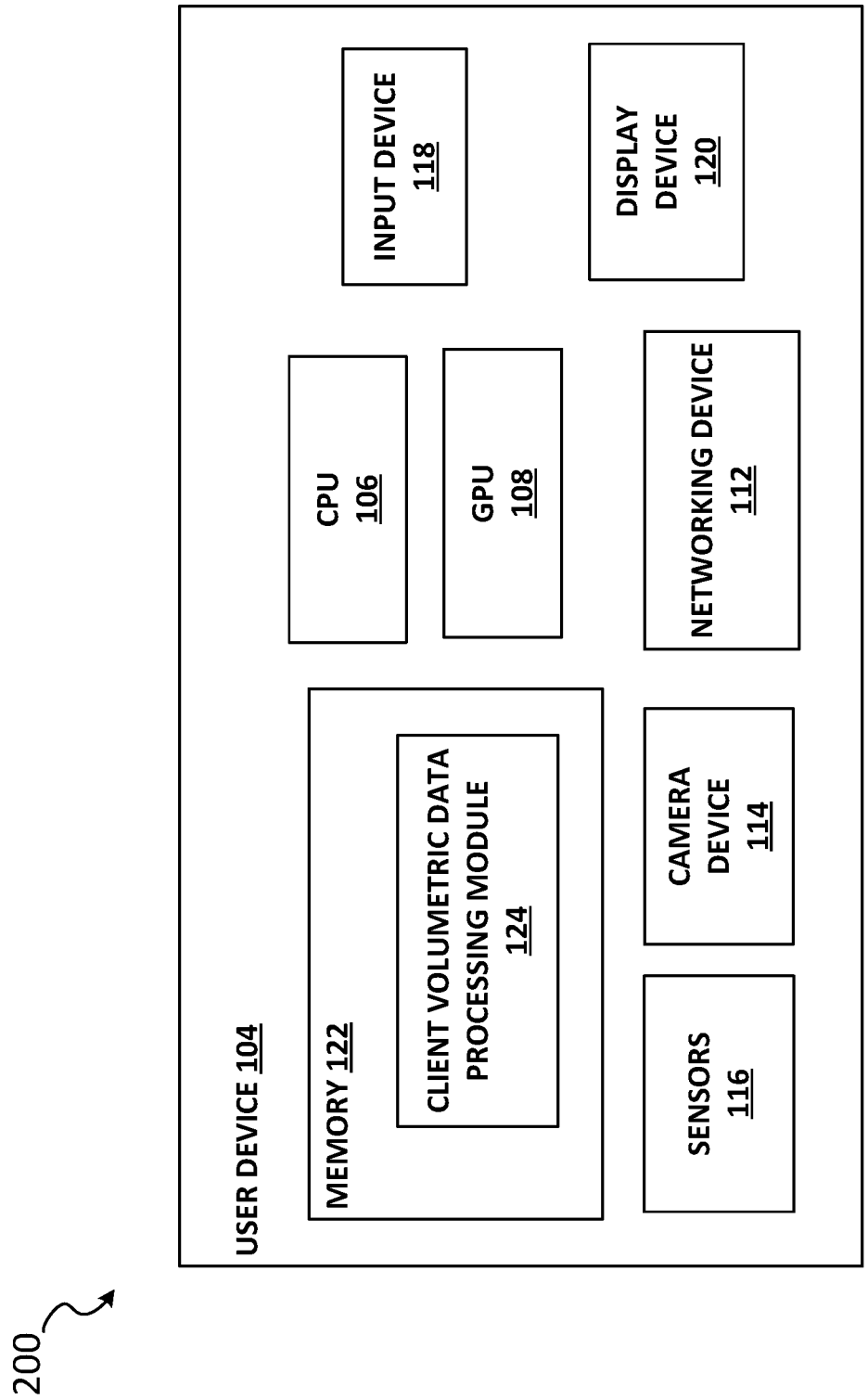
FIG. 2 is a diagrammatic representation of a user device associated with a volumetric data processing system, in accordance with one embodiment.

FIG. 2 is a diagrammatic representation 200 of a user device 104 associated with a volumetric data processing system, in accordance with one embodiment. In one embodiment, the user device 104 (e.g., user device 104A or 104B as shown in FIG. 1) includes one or more CPUs 106 and one or more GPUs 108. The processing device 106 may be any type of processor, processor assembly comprising multiple processing elements (not shown), having access to a memory 122 to retrieve instructions stored thereon, and execute such instructions. Upon execution of such instructions, the instructions implement the processing device 106 to perform a series of tasks or operations, including one or more non-routine tasks or operations or one or more combinations of tasks and operations, as described herein (e.g., in reference to FIGS. 2-5). The user device 104 also includes one or more networking devices 112 (e.g., wired or wireless network adapters) for communicating across the network 150. The user device 104 may further include one or more camera devices 114, which may be configured to capture digital video of the real world near a user (e.g., a user holding the user device 104) during operation. The user device 104 may also include one or more sensors 116, such as a global positioning system (GPS) receiver (e.g., for determining a GPS location of the user device 104), biometric sensors (e.g., for capturing biometric data of a user), motion or position sensors (e.g., for capturing position data of a user or other objects), or an audio microphone (e.g., for capturing sound data). Some sensors 116 may be external to the user device 104, and may be configured to wirelessly communicate with the user device 104 (e.g., such as used in the Microsoft Kinect®, Vive Tracker™, MIT's Lidar sensor, or MIT's wireless emotion detector).

The user device 104 also includes one or more input devices 118. The input device 118 is any type of input unit, such as a mouse, a keyboard, a keypad, pointing device, a touchscreen, a microphone, a camera, a hand-held device (e.g., hand motion tracking device), and the like, for inputting information in the form of a data signal readable by the processing device 106. The user device 104 further includes one or more display devices 120, such as a touchscreen of a tablet or smartphone, or lenses or visor of a VR or AR HMD, which may be configured to display digital objects to a user in conjunction with a real world view.

The user device 104 also includes a memory 122 configured to store a volumetric data processing module ("client module") 124. The memory 122 can be any type of memory devices, such as random access memory, read-only or rewritable memory, internal processor caches, and the like. The memory may store a game engine (not shown) (e.g., executed by the CPU 106 or GPU 108) that communicates with the display device 120, and may also communicate with other hardware such as the input/output device(s) 118 to present a digital asset, such as a 3D game environment (e.g., a video game) or a 3D digital content creation environment to a user. The game engine would typically include one or more modules, including the volumetric data processing module that provide the following: simulation of a virtual environment and digital objects therein (e.g., including animation of digital objects, animation physics for digital objects, collision detection for digital objects, and the like), processing and rendering of the digital assets including virtual environment and the digital objects therein, networking, sound, and the like in order to provide the user with a complete or partial virtual environment (e.g., including video game environment or simulation environment) via the display device 120. In one embodiment, the simulation and rendering of digital assets may be decoupled, each being performed independently and concurrently, such that the rendering step may use a recent state of the virtual environment and current settings of the virtual scene to generate a visual representation at an interactive frame rate and, independently thereof, the simulation step updates the state of at least some of the digital objects (e.g., at another rate).

In one embodiment, the volumetric data processing server 140 includes a memory 132 storing a server volumetric data processing module ("server module") 134. During operation, the client volumetric data processing system module ("client module") 124 and the server module 134 may perform the various volumetric data processing functionalities described herein (e.g., in reference to FIGS. 2-5). More specifically, in some embodiments, some functionality may be implemented within the client module 124, and other functionality may be implemented within the server module 134.

Figure 3:
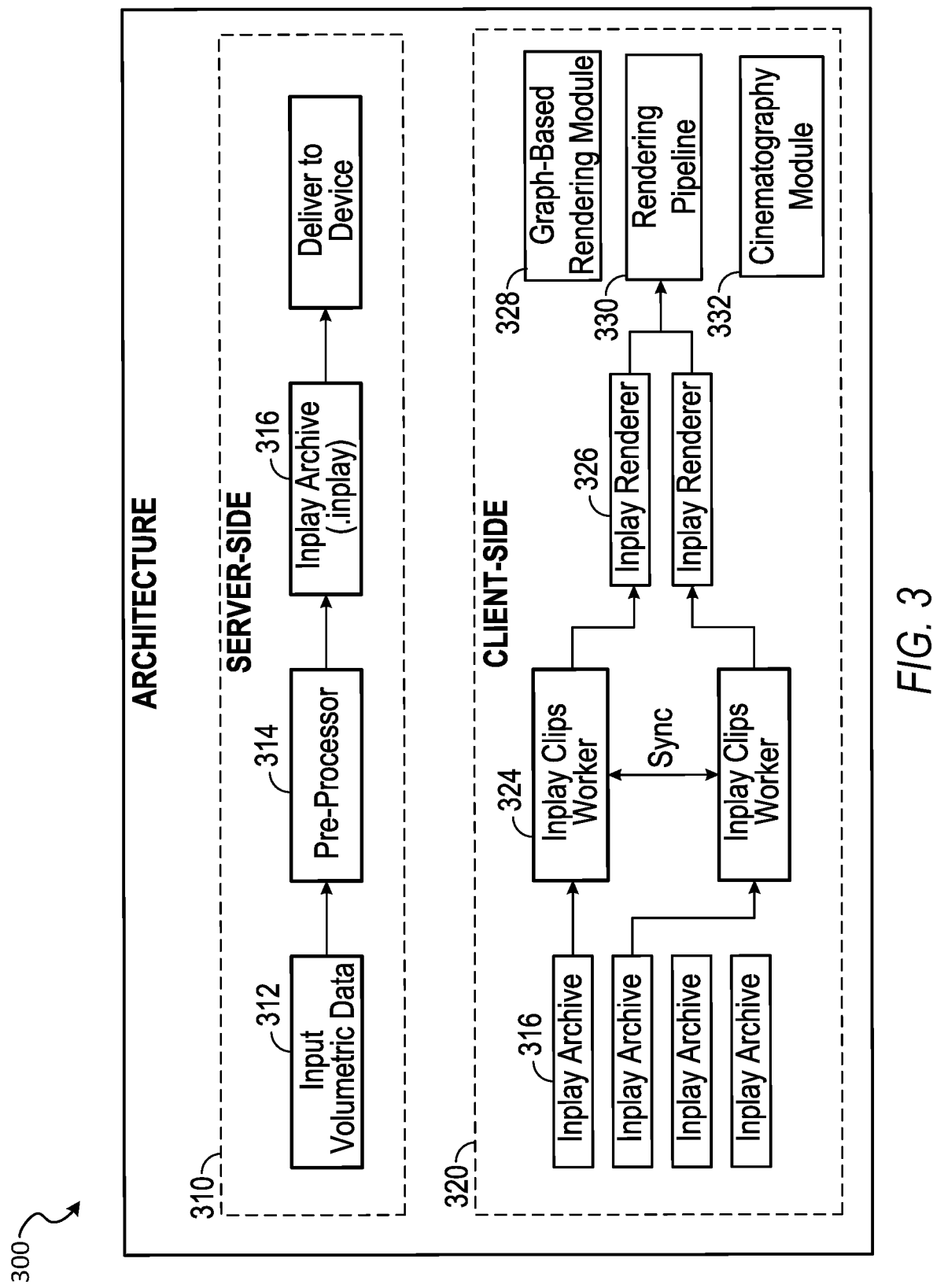
FIG. 3 is a diagrammatic representation of a volumetric data processing system, in accordance with one embodiment.

FIG. 3 is a diagrammatic representation 300 of a volumetric data processing system 100, in accordance with one embodiment. In one embodiment, the elements in block 310 correspond to server-side operations that may be performed by the volumetric data processing server 140, and the elements in block 320 correspond to client-side operations that may be performed by the user device 104.

In one embodiment, on the server side, upon receiving volumetric data 312, the volumetric data processing server 140 sends the volumetric data 312 to a pre-processor unit 314 for file format conversion. The pre-processor unit 314 may function as a file format converter to convert source file formats of the volumetric data 312 into a unified file structure, represented by the flat file format. Specifically, the pre-processor unit 314 creates one or more files 316 (e.g., Inplay archives or Inplay files) in the flat file format (e.g., Inplay file format), representing the input volumetric data 312 received in various source file formats. In accordance with an embodiment, the input volumetric data 312 may be streamed in and processed through the pre-processor 314 into the one or more files 316 as the data arrives. Details of the creation of file 316 in the flat file format are described below with respect to operation 404). The volumetric data processing server 140 transmits the one or more created files 316 to user device 104 for rendering. In one embodiment, the volumetric data processing server 140 may transmit the one or more files 316 to the user device 104 upon receiving a user request to render digital assets associated with the file. In one embodiment, the volumetric data processing server 140 may transmit the one or more files 316 to the user device 104 via a streaming technology. In accordance with an embodiment, once an inplay archive 316 is created by the pre-processor 314, it may be stored (e.g., within a database 142) and the server module 134 may distribute the inplay archive 316 to one or more user devices 104 at any time (e.g., upon receiving a request).

In one embodiment, on the client side, upon receiving the one or more files 316 (e.g., Inplay archive) from the volumetric data processing server 140, the user device 104 may run one or more files 316 through a clip worker unit 324 (e.g, Inplay Clips Worker), a renderer unit 326 (e.g., Inplay Renderer), and an additional specialized rendering module that provides the renderer unit 326 with a shader program (e.g., a shader or compute shader), wherein the shader program is used by the renderer unit 326 to calculate lighting, normals, shadows and more. In accordance with an embodiment, the clip worker unit 324 may act as a controller or director for an application or module requesting a volumetric video rendering, wherein the clip worker unit 324 may receive a request for a rendering (e.g., a rendering starting from a specified frame received from the application or module) and may find and then read or map a memory (e.g., within disk/RAM) that includes the requested data and send it to the GPU for processing and rendering (e.g., as described herein with respect to the methods 400 and 600). The clip worker unit 324 may use information within the request to find the requested data within the memory. The additional specialized rendering modules may include a graph-based rendering module 328, a rendering pipeline 330, a cinematography module 332, and the like for rendering of the digital asset.

Figure 4A:
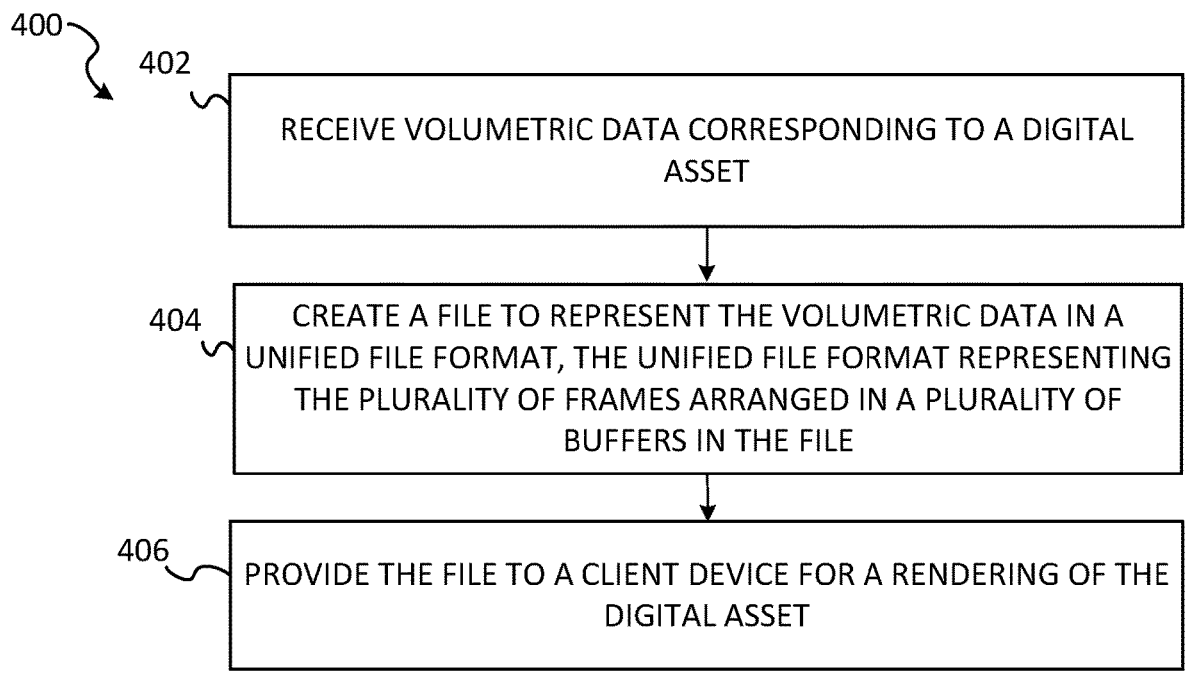
FIG. 4A is a flowchart illustrating a method for volumetric data processing using a volumetric data processing system, in accordance with one embodiment.

FIG. 4A is a flowchart illustrating a method 400 for volumetric data processing using a volumetric data processing system 100, in accordance with one embodiment. Operations of method 400 may be performed by any number of different modules in the volumetric data processing system 100, such as the client module 124 and the server module 134. In various embodiments, some of the method elements shown may be performed concurrently, in a different order than shown, or may be omitted.

In accordance with an embodiment, as part of operation 402, the volumetric data processing system 100 receives volumetric data corresponding to a digital asset. The digital asset includes a plurality of volumetric frames which may compose a volumetric video. A volumetric frame may include a plurality of points with associated data such as position data, color data, and normal data which represents a captured (e.g., recorded) moment of a 3D scene or environment. A volumetric frame may typically include a large number of points (e.g., millions or billions) depending on the resolution of the frame as well as an amount of content (e.g., a portion of the 3D scene) within the frame. For example, based on one second of 3D video comprising 25 frames, a 17-second digital asset may comprise 425 frames, with 5 million points (e.g., disassociated spatial points) in each frame for a total of over 2 billion points.

Figure 7:
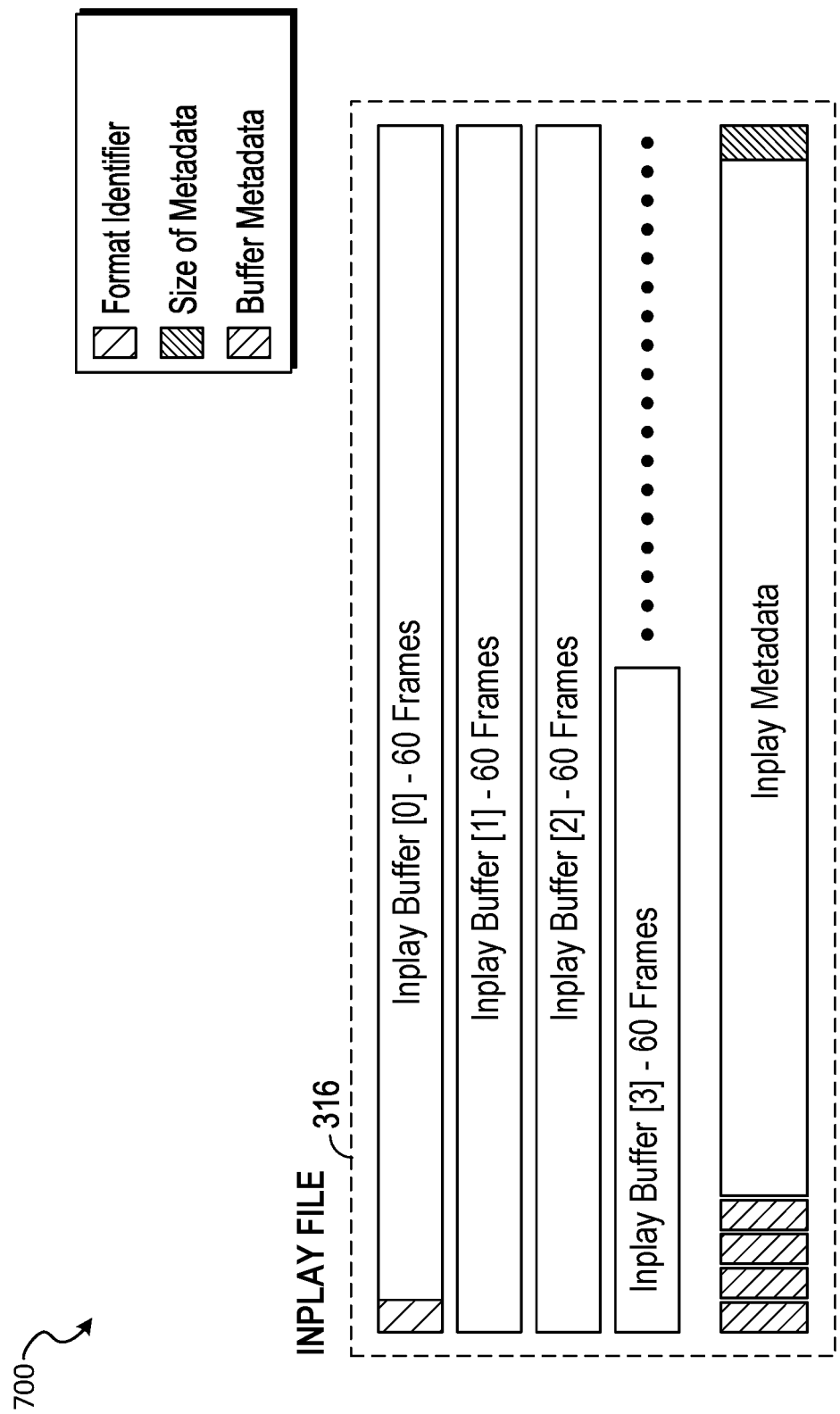
FIG. 7 is a block diagram illustrating an example file in a flat file format, in accordance with one embodiment.

At operation 404, the volumetric data processing system 100 creates a file (e.g., Inplay file 316) to represent the volumetric data in a flat file format (e.g., data organized in the flat file format within a memory). The flat file format representing the plurality of frames is arranged in a plurality of buffers within the file. Each of the plurality of buffers may be assigned with a predetermined number of frames. In one embodiment, the pre-processor unit 314 in the volumetric data processing server 140 may perform aspects of operation 404, acting as a file format converter to convert source file formats of the volumetric data (e.g., input volumetric data 312) into a unified file structure, represented by the flat file format. Specifically, the pre-processor unit 314 may create a file (e.g., an Inplay file 316) in the flat file format (e.g., the Inplay file format), representing the volumetric data in various source file formats as it is streamed in. In the Inplay file, the volumetric frames (e.g., "frames") in the volumetric data may be arranged in pre-allocated buffers. In one embodiment, each of the buffers is assigned with a predetermined number of volumetric frames. For example, an Inplay file may include 4 buffers and 60 frames in each buffer, as illustrated in FIG. 7. In one embodiment, the number of frames arranged in each buffer is a constant number, corresponding to a constant numerical or text value. The constant number of frames in each buffer may be used to identify files with the flat file format.

In accordance with an embodiment, as part of operation 404, the volumetric data in the flat file format may not be within an encoded file structure, but rather stored in a memory in the flat file format.

Figure 5:
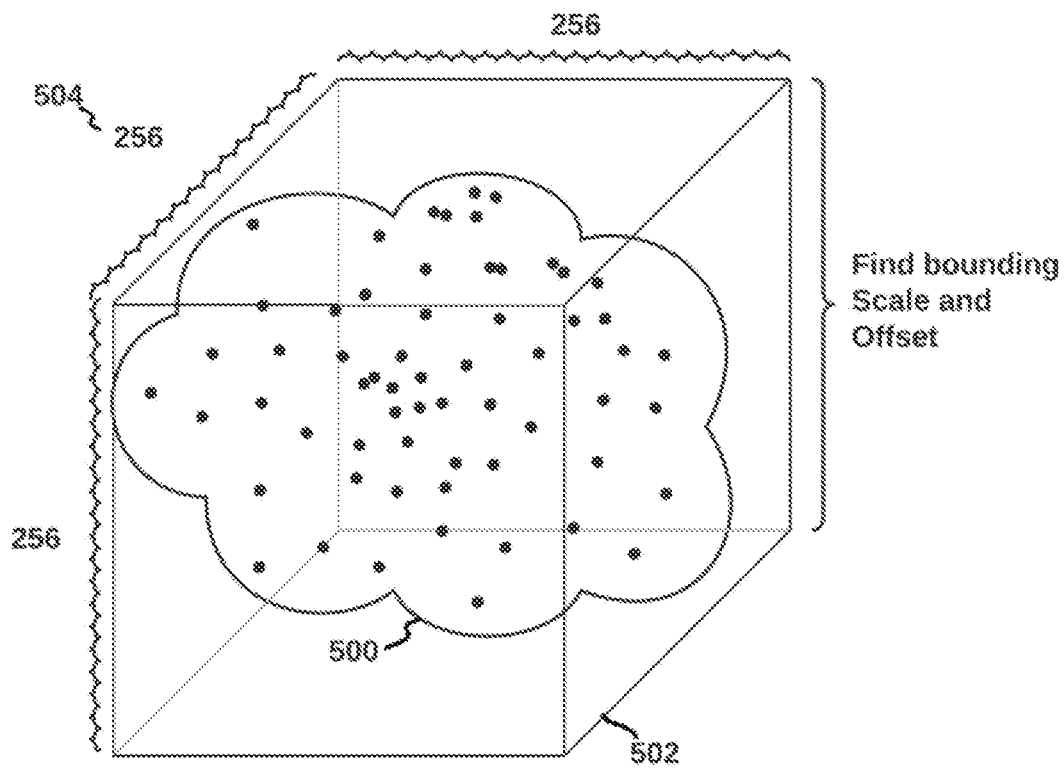
FIG. 5 is an example illustration of a division of a point cloud bounding volume into voxels, in accordance with one embodiment.

In one embodiment, and as part of operation 404 of the method 400, an operation of compression of frame data using voxels (as illustrated in FIG. 9A) may be performed. FIG. 5 shows an example illustration of the compression on a point cloud 500. The compression includes splitting up a bounding volume 502 associated with a frame into a plurality of voxels, wherein point position values XYZ (e.g., from the XYZNXNYNZRGB format) associated with the frame are used as offsets of the voxels. In accordance with an embodiment, the splitting of the bounding volume 502 may be uniform along each dimension and may use factors of 2 for ease of computation (e.g., 256×256×256 or 1024×1024×1024). In other embodiments the splitting of the bounding volume 502 may be non-uniform or may be asymmetric along each dimension. For example, for a single frame and as shown in FIG. 5, a bounding volume 502 for the frame may be split into 256 parts 504 in each dimension (e.g., creating 256×256×256=16,777,216 total voxels), wherein the bounding volume 502 (e.g., bounding box) may be determined with minimum and maximum point position XYZ values for all the points 500 in the frame. The bounding volume 502 for a frame is a volume that includes all volumetric data points 500 for the frame. The size of the bounding volume 502 may vary for each frame depending on the points therein, and may be scaled based on Min/Max values in each dimension. The voxel data may include a voxel position and a voxel offset. The compression may occur during operation 404 (e.g., during a creation of data in the Inplay file format or during creation of an Inplay file), in which voxel data is stored in a voxel list, and the XYZ offsets are stored in a vertex list as shown in FIG. 9A. During processing on the GPU (e.g., during operation 412 and 414), the voxel offset along with the voxel position may be used to determine an absolute position of a point from the point cloud 500.

While any division of the bounding volume 502 may be used, in accordance with one embodiment, the number of voxels may be 256×256×256 within the volume based on a convenience that 1-byte (e.g., one computer byte) can represent 256 values. Accordingly, a point within a voxel can be stored in a reduced amount of memory (e.g., a reduction of almost half the memory space) by storing an XYZ position value of the voxel within the bounding volume in three 1-byte integers (e.g., based on a splitting of the volume into 256 equal parts in each dimension), and in addition, by storing all points within the voxel with an additional XYZ offset of three 1-byte integers (wherein the additional XYZ is a coordinate within a coordinate system relative to the voxel). Accordingly, each point in a frame has a voxel XYZ position value within the bounding volume and an additional XYZ position value offset within the voxel. Accordingly, only (3+3*n) bytes need to be stored for n-points in a voxel since the n-points all share a same 3 byte voxel XYZ position value. Otherwise, without the voxel splitting compression, a full 6*n bytes would be required to store n points based on using three 2-byte integers to represent a 0-65535 value for each point in a volume. The benefit of reduced memory storage increases with the number of points n. In addition, normal and color data are fit into 3-byte increments each (e.g., wherein normal data such as NX, NY, and NZ have one byte each, and color data such Red, Green, and Blue of RGB have one byte each as well). In one embodiment, the voxel compression of the data may benefit a storage aspect which may provide higher bandwidth pushing of data to the GPU.

At operation 406, the volumetric data processing system 100 provides the file to a client device for a rendering of the digital asset. In one embodiment, the Inplay file is read in background threads, wherein the volumetric data processing system 100 may read a given frame into a buffer when the frame is requested for rendering. In one embodiment, a custom rendering program (e.g., shader) is utilized to process frames in parallel on a GPU. In accordance with an embodiment, operation 406 may be performed using streaming techniques such that the data in the flat file format is streamed to the client device 104.

In one embodiment, operations 402, 404, and 406 may be repeatedly performed such that multiple files are provided to the client device 104 in real-time (e.g., the multiple files may be streamed to the client device 104). The client device 104 is configured to process the multiple files (e.g., Inplay files) in parallel for rendering. In one embodiment, the client device is configured to process the plurality of frames of a single Inplay file in parallel for rendering.

In one embodiment, the flat file format, as created in operation 404, for example, allows the client device to directly process the file on a GPU without performing a pre-processing step on the CPU with respect to the file. Accordingly, data from an Inplay file (e.g., data representing one or more frames) being rendered may be copied to a CPU buffer and then directly copied to a GPU buffer without any processing done by the CPU on the data while the data is in the CPU buffer.

Figure 4B:
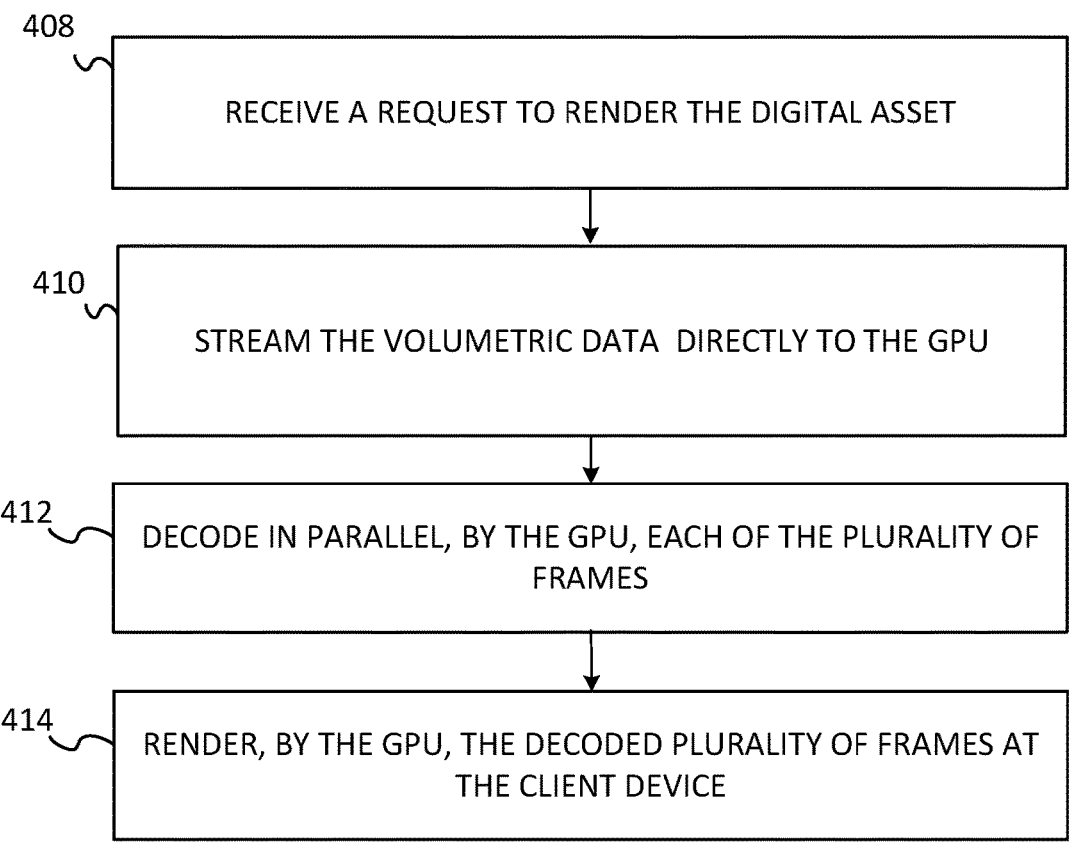
FIG. 4B is a flowchart illustrating a method for volumetric data processing using a volumetric data processing system, in accordance with one embodiment.

FIG. 4B is a flowchart illustrating a method for volumetric data processing using a volumetric data processing system 100, in accordance with one embodiment. The operations of process may be performed by any number of different modules in the volumetric data processing system 100, such as the client module 124 and the server module 134. In various embodiments, some of the operations as shown may be performed concurrently, in a different order than shown, or may be omitted.

At operation 408, the volumetric data processing system 100 receives a request to render the digital asset. The request may be received from client device 104A or client device 104B, or both.

At operation 410, the volumetric data processing system 100 streams volumetric data associated with the requested digital asset directly to the GPU, so that the operation requires minimum resource allocation from the CPU. As part of operation 410, the volumetric data may be copied to a CPU buffer and then directly copied to a GPU buffer without any processing done by the CPU on the volumetric data while the data is in the CPU buffer (e.g., the CPU buffer may act as a pass-through). In one embodiment, as part of operation 410, the volumetric data (or a subset of the volumetric data representing a plurality of frames) may be cached on the CPU (e.g., ready to go to the GPU) and based on the received request, data for one or more frames (e.g., one or more frames specified within the request) within the volumetric data may be moved directly (e.g., without CPU processing) to the GPU for rendering. In one embodiment, the volumetric data may be moved from an Inplay file to the CPU (e.g., in a buffer), and then directly to the GPU (e.g., in a compute buffer) without processing by the CPU due to the data format in the flat file format (e.g., as described in detail in FIG. 7, FIG. 8, and FIGS. 8A and 8B).

In one embodiment, as part of operation 410, during a reading of data within the flat file format (e.g., a reading of the Inplay file), sequence offsets and frame offsets (e.g., as described with respect to FIG. 7) (e.g., generated in operation 404) may be read and cached (e.g., by the CPU), so that one or more desired specific frames can be located and read from anywhere in the file immediately based on a determination of a sequence offset and frame offset for the desired specific frames (e.g., based on the received request in operation 408, such as from a 'seek' or 'scrubbing' video search function). The flat format allows scrubbing and skipping through time/frames very quickly (e.g., when compared to other compressed format that may need processing by a CPU prior to the GPU) due to the flat format being a straight sequence, making it easy to seek and read/copy.

In one embodiment, as part of operation 410, packed frame data (e.g., including voxels and XYZNXNYNZRGB data or mesh and texture data) may be read and placed in a series of arrays (e.g., by the Inplay Clips Worker 324 shown in FIG. 3) within a compute buffer for the GPU 108. The Inplay Renderer unit 326 (as shown in FIG. 3) may upload the frame data to the GPU 108 and may dispatch a job to organize the packed data into render-friendly buffers as part of operation 412 (e.g., index buffers, vertex buffers, normal buffer, etc.). Based on the organizing of the packed data into buffers being done on the GPU (e.g., as per the above), the data is ready to be used by a final rendering operation (e.g., a shader created by a graph-based rendering module 328, a rendering pipeline 330, a cinematography module 332, or the like).

At operation 412, the parallel computational units in the GPU of the volumetric data processing system 100 decodes each volumetric frame in parallel. In accordance with an embodiment, as part of operation 412, the decoding may include unpacking and separation of the data (e.g., for point cloud and mesh data). The unpacking and separation may be different based on the data being point cloud data or mesh data. For example, based on the data being in a point cloud form, some simple bit shifting can be used to manipulate (e.g., separate) the position, normal and color data into one or more buffers to be used by the GPU based on settings within the GPU. For example a GPU setting may require position and color data in a first buffer with normal data in a second buffer. The unpacking may also include a conversion of byte data to float format, which may also be based on a setting within the GPU. Similarly, volumetric data in a mesh format including index, vertex, normal and UV data in the flat file format can be bit shifted and put into one or more buffers for the GPU to use, based on settings within the GPU.

The unpacking and separation of the data in operation 412 may be performed optimally on the GPU based on the data being in the flat file format. Accordingly, the data may be processed by the GPU in a highly parallel way when compared to processing of the data on the CPU. For example, based on the linear storing of data in the flat file format (e.g., wherein the point data is stored in a sequence of XYZNXNYNZRGB n-times for n points), the separation of data into buffers and the conversion to float format may be processed in a highly parallelized way on a plurality of chunks using simple bit shifting processes. For example, based on point data being stored in the XYZNXNYNZRGB flat data format, wherein each point is stored compactly in 9 bytes with one byte for each of X, Y, Z, NX, NY, NZ, R, G, and B (e.g., or 6 bytes without normal data), some simple bitwise operators can be used to shift and unpack the data.

At operation 414, the GPU 108 of the volumetric data processing system 100 renders the decoded and unpacked volumetric frames at the client device 104. In one embodiment, the volumetric data processing system 100 caches the decoded and unpacked volumetric frames on the CPU 106. When receiving a request to render a frame, the volumetric data processing system 100 transmits the frame from the CPU cache to the GPU for rendering. In one embodiment, the volumetric data is drawn (e.g., rendered) procedurally on the GPU of the server module as it is being received or streamed in, wherein a procedural drawing includes the GPU using a compute buffer but not using a vertex buffer or index buffer. Accordingly, geometry is read from the compute buffer to generate data on the GPU, without requiring a readback to the CPU. This operation 414 may comprise additional operations, such as the operations of method 600, as illustrated in FIG. 6.

In one embodiment, operation 414 may use procedural rendering using a compute shader with the packed GPU format (e.g., generated in operation 404) to procedurally process the voxel data, XYZ data, RGB data, and normal data into a vertex buffer and index buffer on the GPU (e.g., with an advantage of being done on the GPU so the buffers are ready for rendering in the shader). Furthermore, as part of rendering, points may be procedurally removed based on a distance from the camera (e.g., based on a level of detail LOD determination) or a change in normals (e.g., a surface facing away from a camera), etc. In one embodiment, during rendering, a predetermined shape (e.g., a splat) may be drawn at the position, color, or a normal buffer attributes for each point in a Point Cloud associated with a frame.

In one embodiment, and as part of operation 414, a size and an amount of points being rendered may be dynamically changed based on a distance of a camera from the Point Cloud, and a bounding size of the Point Cloud. For example, a size of geometry representing a point during rendering (e.g., a splat size) and a number of points being rendered via a camera view may dynamically change. In accordance with one embodiment, the size of the geometry may be directly proportional to a distance between a camera and an object to be rendered (e.g., a Point Cloud). In one embodiment, the number of points may be inversely proportional to the distance between the camera and the object to be rendered.

Figure 6:
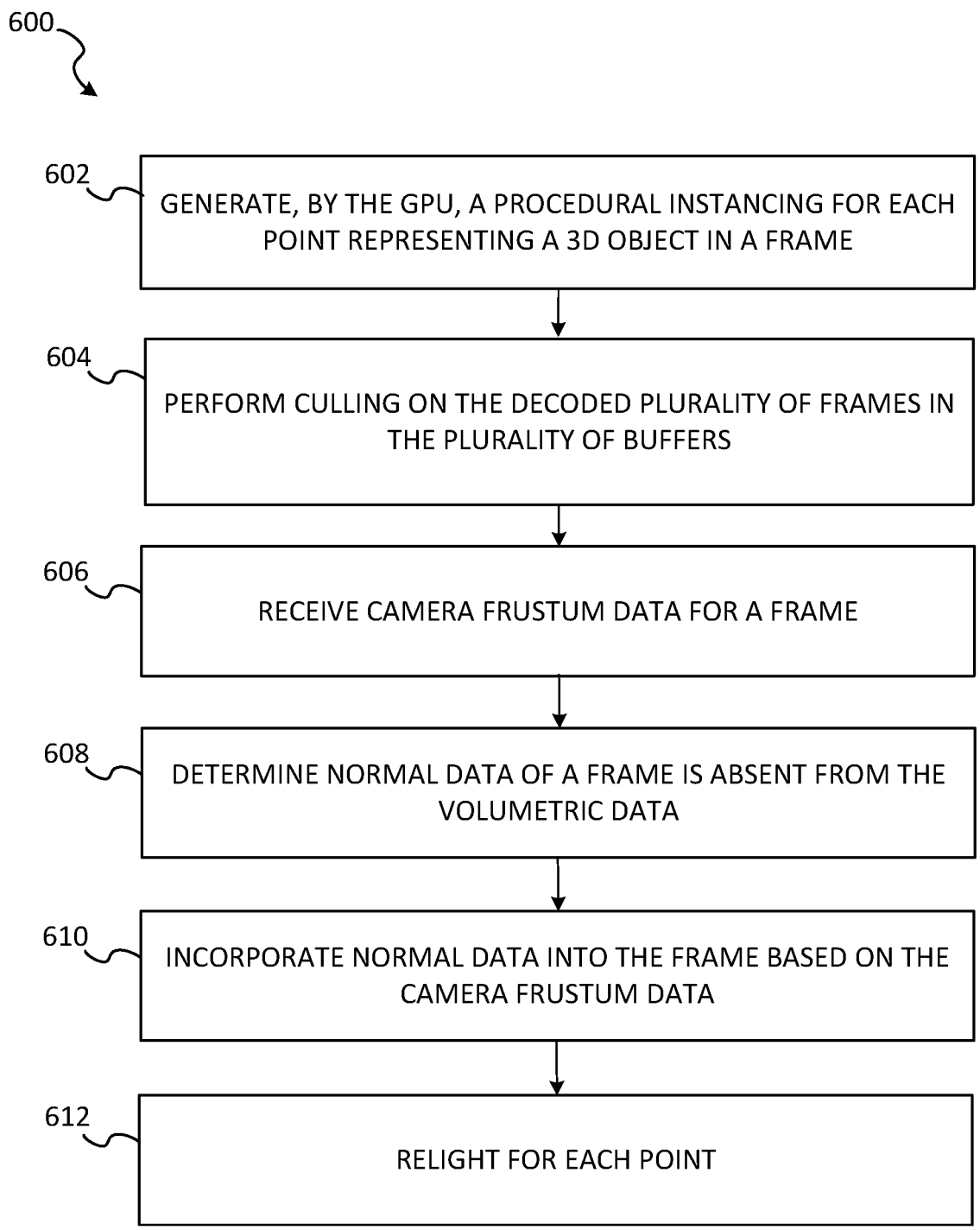
FIG. 6 is a flowchart illustrating a method for volumetric data processing and rendering of a digital asset using a volumetric data processing system, in accordance with one embodiment.

FIG. 6 is a flowchart illustrating a method 600 for volumetric data processing and rendering of a digital asset using a volumetric data processing system 100, in accordance with one embodiment. The operations of the method 600 may be performed by any number of different modules in the volumetric data processing system 100, such as the client module 124 and the server module 134. In various embodiments, some of the operations as shown may be performed concurrently, in a different order than shown, or may be omitted.

Operation 414, as discussed in FIG. 4B, may include further operations 602-612. In one embodiment, the operations of the method 600 may be performed by the GPU of either the client module 124 or the server module 134.

At operation 602, the volumetric data processing system 100 generates a procedural instancing for each point representing a 3D object in a volumetric frame. In one embodiment, the GPU may generate an instance for every point in the Point Cloud based on the packed data, for example, in the format XYZNXNYNZRGB. The GPU may efficiently decode each point or frame in parallel.

At operation 604, the volumetric data processing system 100 performs a culling operation on the decoded plurality of frames in the plurality of buffers. The culling operation may include frustum culling and occlusion culling. It should be understood by a person of ordinary skill in the art that occlusion culling is an operation that disables the rendering of objects which are not currently seen by a camera because they are obscured (occluded) by other objects. It should be understood by a person of ordinary skill in the art that frustum culling instead disables rendering for objects that are outside the camera's viewing area but does not disable anything hidden from view by overdraw.

At operation 606, the volumetric data processing system 100 receives camera frustum data for a frame. It should be understood by a person of ordinary skill in the art that in 3D computer graphics, the camera frustum data is data of view frustum that is a region of space in a modeled world that may appear on a display screen. The view frustum refers to the field of a region within the modeled world that can be seen and rendered by a perspective camera. In one embodiment, the received camera frustum data includes position, orientation, and camera parameters (e.g., field of view) for a camera positioned to capture some or all of the volumetric data (e.g., a camera positioned to capture a portion of a Point Cloud). The camera may capture any portion of volumetric data associated with a frame, from any angle, and from any relative distance.

At operation 608, the volumetric data processing system 100 determines if data associated with a particular frame includes normal data within the volumetric data. Upon determining the normal data is absent, at operation 610, the volumetric data processing system 100 determines and incorporates normal data within the particular frame based on the received camera frustum data (e.g., using camera facing techniques which may include using a group of neighboring points and associated tangents with respect to a camera plane).

At operation 612, the volumetric data processing system 100 may relight each point in a frame. In one embodiment, based on the methods described in FIG. 4A, FIG. 4B, and FIG. 6, (e.g., and the use therein of the flat file format) providing a computational benefit during a rendering, additional computational resources may become available each frame when compared to a rendering without the use of the methods. The additional computational resources may then be used for additional computations on the volumetric data on a real-time basis, including computations related to real-time lighting. As shown below in FIG. 9A, the flat file format may include normal data for each point and/or voxel data within a frame. In addition, as mentioned in operation 608 and 610, normal data may be added to frame data if such data is missing. In one embodiment, the normal data associated with points within a frame may be used during operation 612 to provide real-time lighting. In one embodiment, real-time lighting provides direct lighting to illuminate characters and other movable geometry in a scene in real-time, and updates lighting in every frame.

FIG. 7 is a block diagram illustrating an example data structure (e.g., a file) 700 created in a flat format, in accordance with one embodiment. In one embodiment, the volumetric data processing system 100 comprises a pre-processor unit 314 acting as a file format converter to convert the volumetric data from source file formats into a unified file structure, represented by the flat file format. Specifically, the pre-processor unit creates a file 700 (e.g., an Inplay file 316) as shown in FIG. 7. The file 700 represents the volumetric data from various source file formats (e.g., as it is streamed in) after it is converted (e.g., within operation 404) to the unified file structure, represented by the flat file format. The volumetric frames in the volumetric data are arranged in pre-allocated buffers. Buffers in an Inplay file correspond to a collection of frames or a sequence of frames.

The file 700 is illustrated in an example flat file format (e.g., Inplay file format). A flat file format may include any number of buffers, with each having any number of frames. As shown in FIG. 7, file 700 includes 4 buffers, i.e., buffers [0]-[3]. Each buffer includes a predetermined number (i.e., 60) of volumetric frames. The file 700 also includes file metadata ("Inplay metadata"), buffer metadata, a value of the size of the file metadata (e.g., a combined size of Inplay metadata and buffer metadata), and a value of a format identifier used to identify files in the flat file format. The format identifier may be a unique numerical, text or alphanumeric value which identifies a file as an Inplay file in the flat file format. The format identifier may also be a simple numerical or text value that may be used to identify a file as an Inplay file in the flat file format within the first few bytes of the file. In one embodiment, as illustrated in FIG. 7, the format identifier may be the predetermined number (i.e., 60) of volumetric frames arranged in each buffer. In one embodiment, the predetermined number of volumetric frames arranged in each buffer corresponds to the frame rate in which the volumetric data was captured. For example, suppose the volumetric data was captured at 60 frames per second (fps), the predetermined number of volumetric frames arranged in each buffer is 60, and the value of the format identifier may also be 60. In one embodiment, the number of frames arranged in each buffer may correspond to a random number.

In one embodiment, and as shown in FIG. 7, the value of the size of the file metadata may be positioned or arranged at the end of the file data, which makes the value easy to find and also allows for quick navigation within the file metadata (e.g., due to the value providing bounds (e.g., memory position bounds) of the file metadata within a file). In one embodiment, the file metadata may include a number of frames, a custom archive string, an author identifier (e.g., a string or numerical value), a version identifier, a frame rate, an identifier for a type of volumetric format (e.g., Point Cloud or mesh), and 2 lists that enable quick seeking to any target frame. In one embodiment, a first list of the 2 lists includes (e.g., a list of sequences): a value for a start frame for each sequence in the list of sequences (e.g., 0,30,60,90), a value for a number of frames in each sequence in the list of sequences, and a plurality of offset values (e.g., frame byte offset values), wherein each offset value of the plurality of offset values is a value in bytes of an offset for each frame within a sequence. In one embodiment, a second list of the 2 lists includes a list of offsets (e.g., in bytes) of the sequence data. For example, the second list (e.g., the list of the offsets of the sequence data) includes a list of byte offsets, wherein each byte offset identifies a location of an Inplay buffer within the file (e.g., a location of a start frame). A location of a target frame within a file may be found quickly using the 2 lists, whereby the location of the target is determined by adding a sequence offset and a frame offset (e.g., sequence byte offset+frame byte offset). In one embodiment, additional metadata can be added to the Inplay Metadata (e.g., after the 2 lists). The additional metadata may include semantic information associated with an object within a frame, for example, the additional metadata may identify a plurality of points within a frame that is associated with a specific object, such as a soccer ball (e.g., based on the Inplay file including frames of a soccer game). The additional metadata may also identify a set of points within a frame as a camera target (e.g., a camera used for rendering as part of operation 414).

Figure 8:
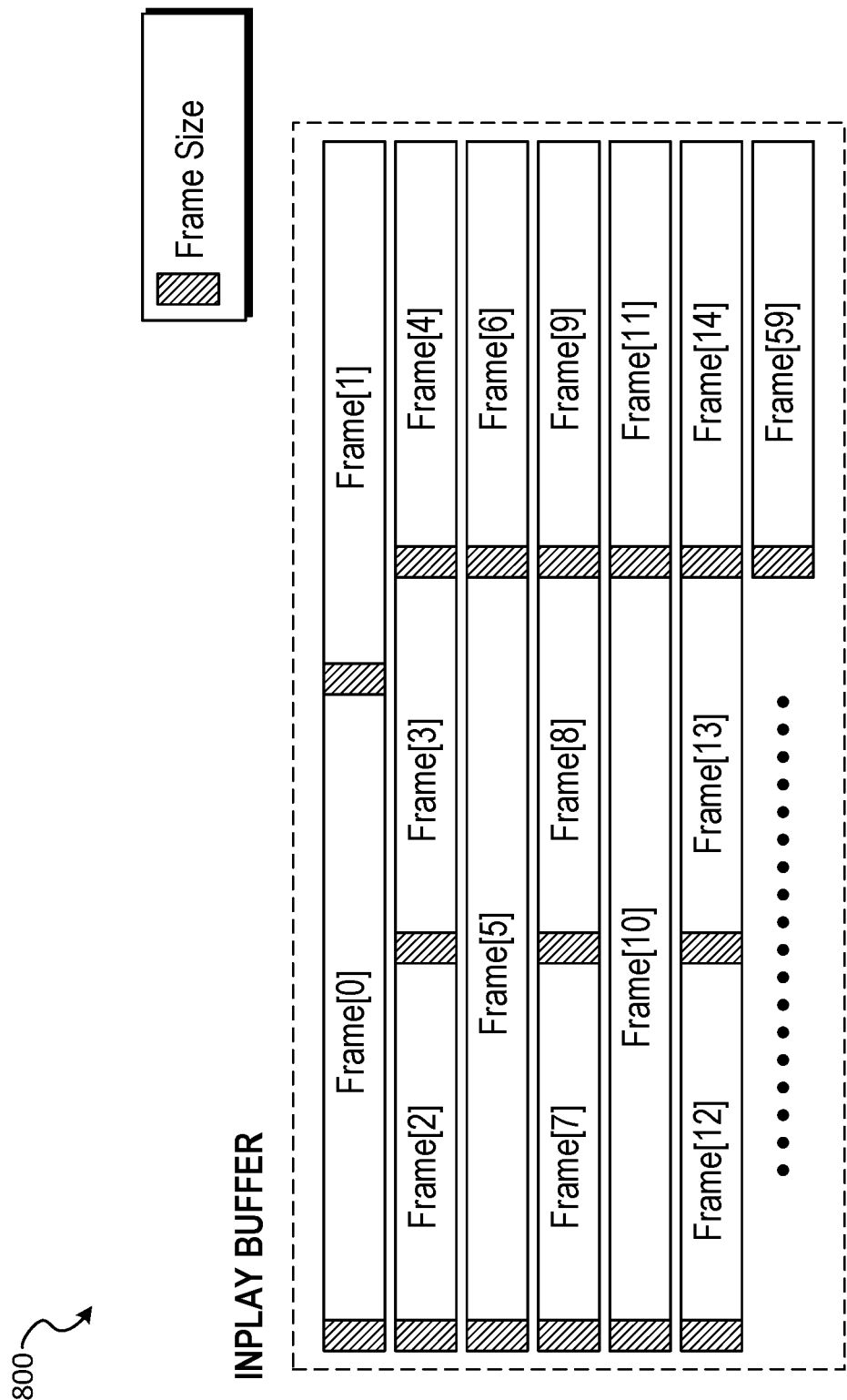
FIG. 8 is a block diagram illustrating an example buffer allocation for an example file in a flat file format, in accordance with one embodiment.

FIG. 8 is a block diagram 800 illustrating an example buffer allocation for an example file 700 created in a flat file format, in accordance with one embodiment. In one embodiment, buffer includes a plurality of frames, e.g., Frames [0]-[59]. Each frame is associated with a value indicating the size (e.g., in bytes) of that particular frame.

Figure 9B:
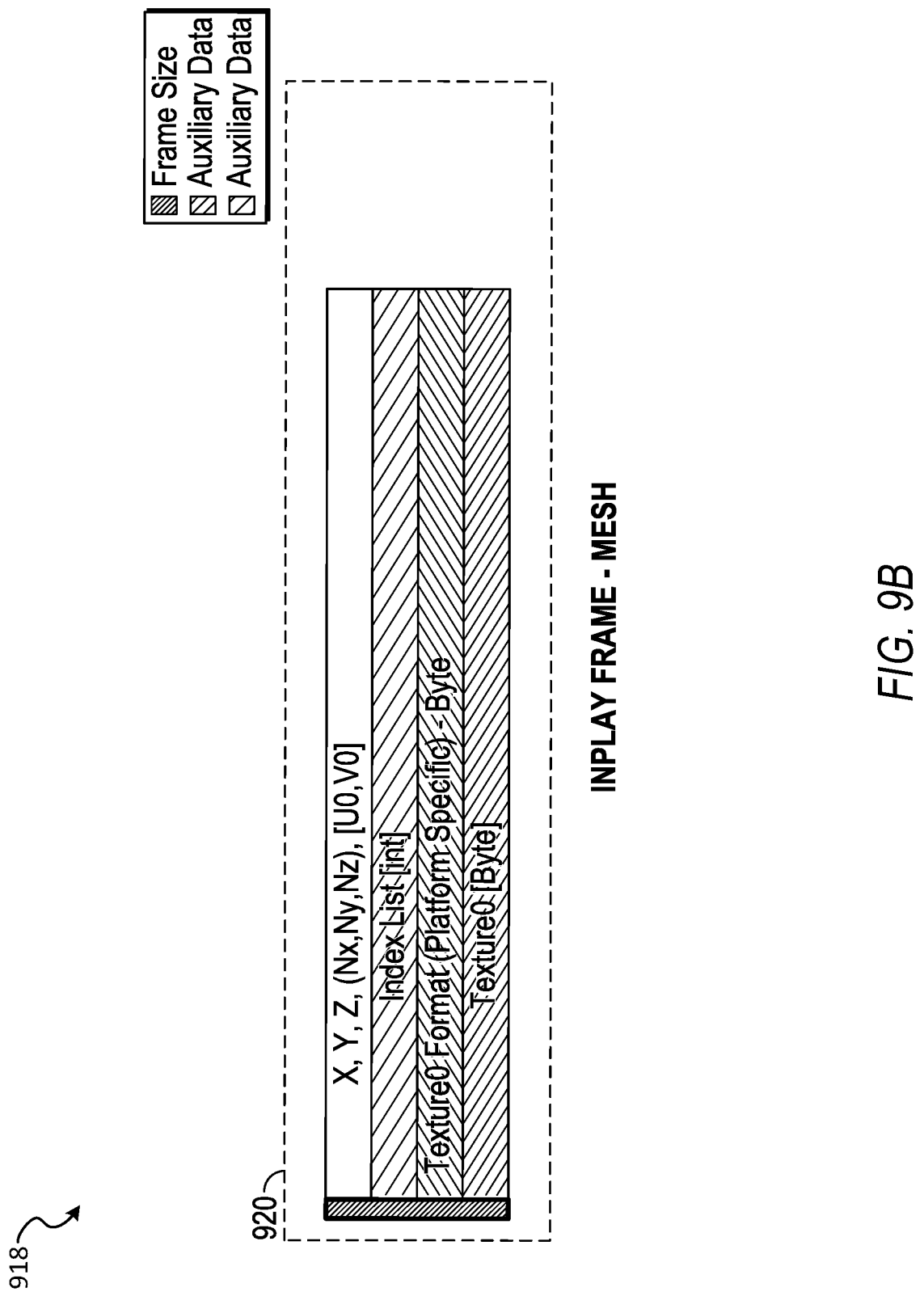

FIG. 9A and FIG. 9B depict block diagrams 900 and 918 illustrating examples of volumetric frames, in accordance with one embodiment. Volumetric data may correspond to different types of datasets, including Point Cloud datasets as shown in FIG. 9A, and Mesh-based datasets as shown in FIG. 9B. In one embodiment, volumetric frame 910 represents a volumetric frame of Point Cloud datasets, wherein each point may be associated with position attributes (e.g., X,Y,Z) and color attributes (e.g., RGB). In one embodiment, volumetric frame 912 represents a volumetric frame of Point Cloud datasets, wherein each point may be associated with position attributes (e.g., X,Y,Z), normal attributes (e.g., NX, NY, NZ), and color attributes (e.g., RGB). Based on the Point Cloud dataset not containing normal information, the volumetric data processing system may generate such information on the fly using camera-facing techniques (e.g., during operation 610). In one embodiment, volumetric frame 914 represents a volumetric frame of Point Cloud datasets, wherein points are associated with position attributes (e.g., X,Y,Z) and color attributes (e.g., RGB), as well as voxel data as generated in operation 404. In one embodiment, volumetric frame 916 represents a volumetric frame of Point Cloud datasets, wherein points are associated with position attributes (e.g., X,Y,Z), normal attributes (e.g., Nx,Ny,Nz) and color attributes (e.g., RGB), as well as voxel data as generated in operation 404.

In one embodiment, as shown in FIG. 9A, the voxel data may be grouped in a separate list (e.g., array) from the point data (e.g., the position, color, and normal data). The separation of the data may allow parallel iteration on the GPU. For example, during operation 412, the voxel list and the point data list may be processed in tandem in the GPU (e.g., by running a compute shader with multiple groups, with one group running a job over a size of the voxel count in one dimension, and with a second group running a job over a size of the data point group in another). In one embodiment, VB_offset may include a location in a vertex buffer containing the XYZ offset, and normal/color information. The value V_num may include a number of vertices in the voxel so that the data may be processed from VB_offset+V_num number of vertices.

In one embodiment, volumetric frame 920 represents a volumetric frame of Mesh-based datasets. The volumetric frame 920 includes mesh information and textures that represent attributes of the frame, as shown in FIG. 9B. In one embodiment, arbitrary data may be associated with the frame attributes that may include compressed texture and triangles list or vertex list. The GPU may read the compressed texture. Triangles list or vertex list may assist with rendering of digital assets.

Figure 10:
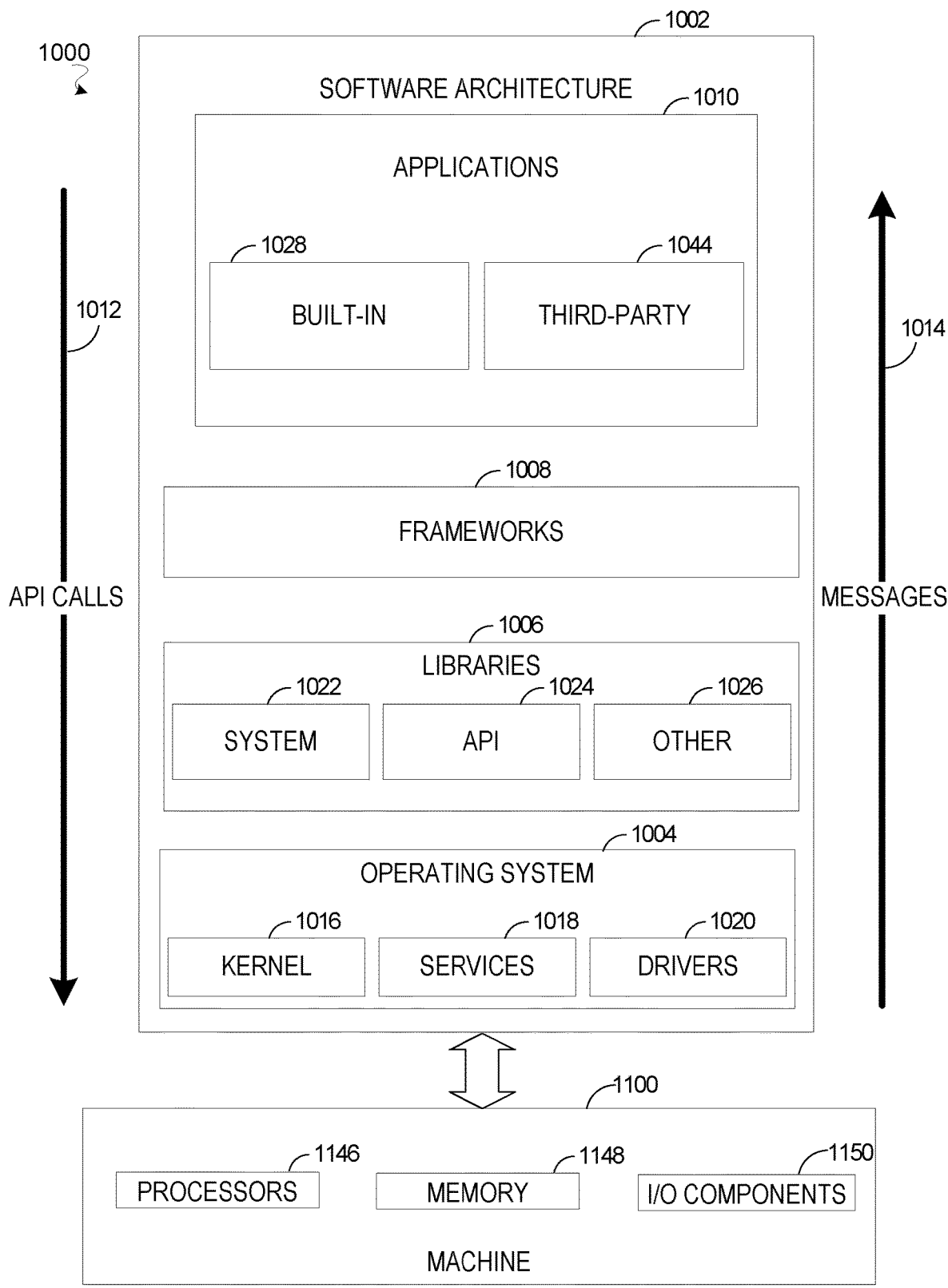
FIG. 10 is a block diagram illustrating an example software architecture, which may be used in conjunction with various hardware architectures described herein.

FIG. 10 is a block diagram 1000 illustrating an example software architecture 1002, which may be used in conjunction with various hardware architectures herein described to provide a gaming engine and/or components of the volumetric data processing system 100. FIG. 10 is a non-limiting example of a software architecture and it will be appreciated that many other architectures may be implemented to facilitate the functionality described herein. The software architecture 1002 may execute on hardware such as a machine 1100 of FIG. 11 that includes, among other things, processors 1146, memory 1148, and input/output (I/O) components 1150. A representative hardware layer is illustrated and can represent, for example, the machine 1100 of FIG. 11. The representative hardware layer includes a processing unit having associated executable instructions. The executable instructions represent the executable instructions of the software architecture 1002, including implementation of the methods, modules and so forth described herein. The hardware layer also includes memory/storage, which also includes the executable instructions.

In the example architecture of FIG. 10, the software architecture 1002 may be conceptualized as a stack of layers where each layer provides particular functionality. For example, the software architecture 1002 may include layers such as an operating system 1004, libraries 1006, frameworks or middleware 1008, applications 1010 and a presentation layer. Operationally, the applications 1010 and/or other components within the layers may invoke application programming interface (API) calls 1012 through the software stack and receive a response as messages 1014. The layers illustrated are representative in nature and not all software architectures have all layers. For example, some mobile or special purpose operating systems may not provide the frameworks/middleware 1008, while others may provide such a layer. Other software architectures may include additional or different layers.

The operating system 1004 may manage hardware resources and provide common services. The operating system 1004 may include, for example, a kernel 1016, services 1018, and drivers 1020. The kernel 1016 may act as an abstraction layer between the hardware and the other software layers. For example, the kernel 1016 may be responsible for memory management, processor management (e.g., scheduling), component management, networking, security settings, and so on. The services 1018 may provide other common services for the other software layers. The drivers 1020 may be responsible for controlling or interfacing with the underlying hardware. For instance, the drivers 1020 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1006 may provide a common infrastructure that may be used by the applications 1010 and/or other components and/or layers. The libraries 1006 typically provide functionality that allows other software modules to perform tasks in an easier fashion than to interface directly with the underlying operating system 1004 functionality (e.g., kernel 1016, services 1018 and/or drivers 1020). The libraries 1006 may include system libraries 1022 (e.g., C standard library) that may provide functions such as memory allocation functions, string manipulation functions, mathematic functions, and the like. In addition, the libraries 1006 may include API libraries 1024 such as media libraries (e.g., libraries to support presentation and manipulation of various media format such as MPEG4, H.264, MP3, AAC, AMR, JPG, PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1006 may also include a wide variety of other libraries 1026 to provide many other APIs to the applications 1010 and other software components/modules.

The frameworks 1008 (also sometimes referred to as middleware) provide a higher-level common infrastructure that may be used by the applications 1010 and/or other software components/modules. For example, the frameworks/middleware 1008 may provide various graphic user interface (GUI) functions, high-level resource management, high-level location services, and so forth. The frameworks/middleware 1008 may provide a broad spectrum of other APIs that may be utilized by the applications 1010 and/or other software components/modules, some of which may be specific to a particular operating system or platform.

The applications 1010 include built-in applications 1028 and/or third-party applications 1044. Examples of representative built-in applications 1028 may include, but are not limited to, a contacts application, a browser application, a book reader application, a location application, a media application, a messaging application, and/or a game application. Third-party applications 1044 may include any an application developed using the Android™ or iOS™ software development kit (SDK) by an entity other than the vendor of the particular platform, and may be mobile software running on a mobile operating system such as iOS™, Android™, Windows® Phone, or other mobile operating systems. The third-party applications 1044 may invoke the API calls 1012 provided by the mobile operating system such as operating system 1004 to facilitate functionality described herein.

The applications 1028 may use built-in operating system functions (e.g., kernel 1016, services 1018 and/or drivers 1020), libraries 1006, or frameworks/middleware 1008 to create user interfaces to interact with users of the system. Alternatively, or additionally, in some systems, interactions with a user may occur through a presentation layer, such as the presentation layer. In these systems, the application/module "logic" can be separated from the aspects of the application/module that interact with a user.

Some software architectures use virtual machines. In the example of FIG. 10, this is illustrated by a virtual machine. The virtual machine creates a software environment where applications/modules can execute as if they were executing on a machine (such as the machine 1100 of FIG. 11, for example). The virtual machine is hosted by a host operating system (e.g., operating system 1004) and typically, although not always, has a virtual machine monitor, which manages the operation of the virtual machine as well as the interface with the host operating system (i.e., operating system 1004). A software architecture executes within the virtual machine such as an operating system (OS) 1004, libraries 1006, frameworks 1008, applications 1010, and/or a presentation layer. These layers of software architecture executing within the virtual machine can be the same as corresponding layers previously described or may be different.

Figure 11:
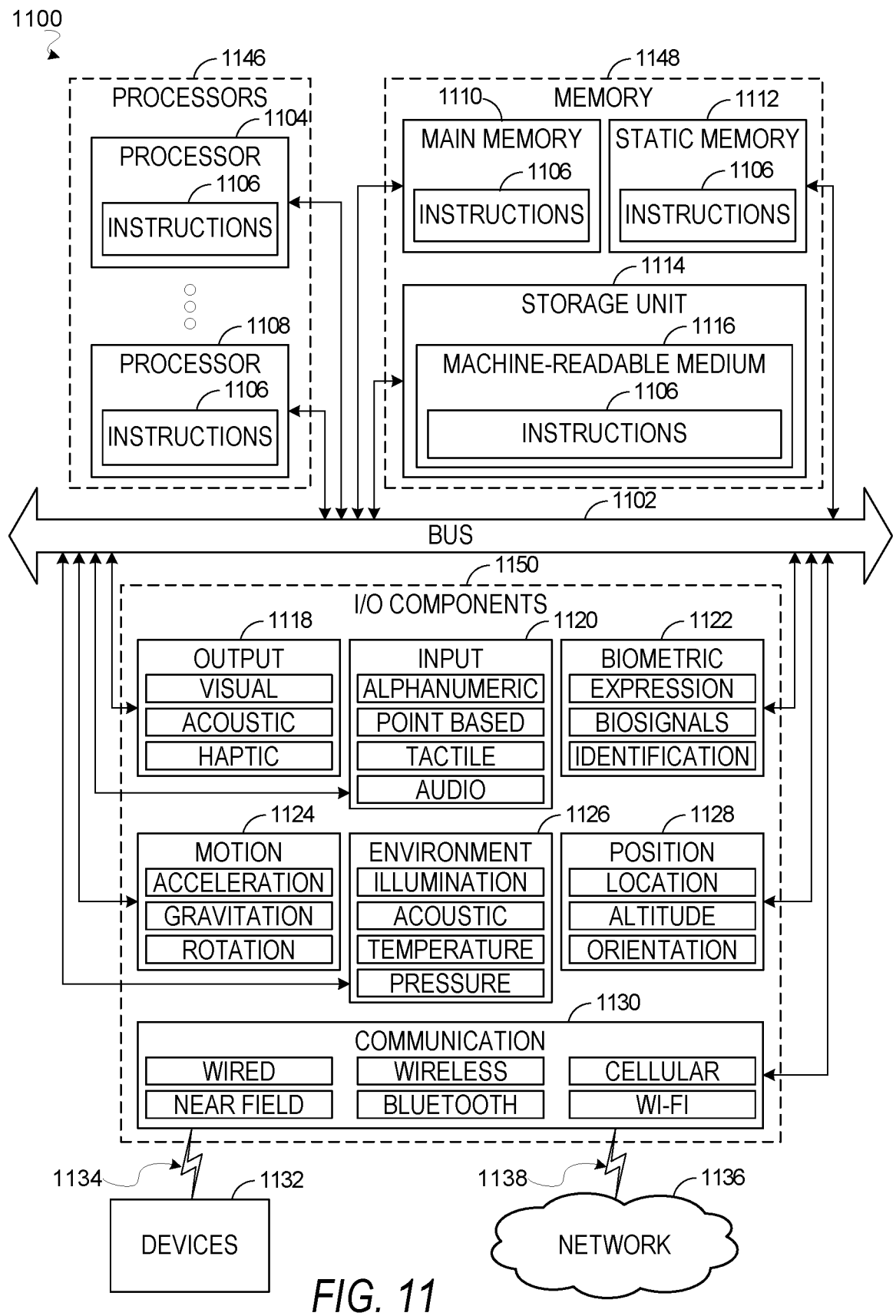
FIG. 11 is a block diagram illustrating components of a machine, according to some example embodiments, configured to read instructions from a machine-readable medium (e.g., a non-transitory machine-readable storage medium) and perform any one or more of the methodologies discussed herein.

FIG. 11 is a block diagram illustrating components of a machine 1100, according to some example embodiments, configured to read instructions from a machine-readable medium (e.g., a machine-readable storage medium) and perform any one or more of the methodologies discussed herein. In some embodiments, the machine 1100 is similar to the user device 104. Specifically, FIG. 11 shows a diagrammatic representation of the machine 1100 in the example form of a computer system, within which instructions 1106 (e.g., software, a program, an application, an applet, an app, or other executable code) for causing the machine 1100 to perform any one or more of the methodologies discussed herein may be executed. As such, the instructions 1106 may be used to implement modules or components described herein. The instructions transform the general, non-programmed machine into a particular machine programmed to carry out the described and illustrated functions in the manner described. In alternative embodiments, the machine 1100 operates as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1106, sequentially or otherwise, that specify actions to be taken by the machine 1100. Further, while only a single machine 1100 is illustrated, the term "machine" shall also be taken to include a collection of machines that individually or jointly execute the instructions 1106 to perform any one or more of the methodologies discussed herein.

The machine 1100 may include processors 1146, memory 1148, and input/output (I/O) components 1150, which may be configured to communicate with each other such as via a bus 1102. In an example embodiment, the processors 1146 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1104 and a processor 1108 that may execute the instructions 1106. The term "processor" is intended to include multi-core processor that may comprise two or more independent processors (sometimes referred to as "cores") that may execute instructions contemporaneously. Although FIG. 11 shows multiple processors, the machine 1100 may include a single processor with a single core, a single processor with multiple cores (e.g., a multi-core processor), multiple processors with a single core, multiple processors with multiples cores, or any combination thereof.

The memory/storage 1148 may include a memory, such as a main memory 1110, a static memory 1112, or other memory, and a storage unit 1114, both accessible to the processors 1146 such as via the bus 1102. The storage unit 1114 and memory 1110, 1112 store the instructions 1106 embodying any one or more of the methodologies or functions described herein. The instructions 1106 may also reside, completely or partially, within the memory 1110, 1112, within the storage unit 1114, within at least one of the processors 1146 (e.g., within the processor's cache memory), or any suitable combination thereof, during execution thereof by the machine 1100. Accordingly, the memory 1110, 1112, the storage unit 1114, and the memory of processors 1146 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store the instructions 1106. The term "machine-readable medium" shall also be taken to include any medium, or combination of multiple media, that is capable of storing instructions (e.g., instructions 1106) for execution by a machine (e.g., machine 1100), such that the instructions, when executed by one or more processors of the machine 1100 (e.g., processors 1146), cause the machine 1100 to perform any one or more of the methodologies or operations, including non-routine or unconventional methodologies or operations, or non-routine or unconventional combinations of methodologies or operations, described herein. Accordingly, a "machine-readable medium" refers to a single storage apparatus or device, as well as "cloud-based" storage systems or storage networks that include multiple storage apparatus or devices. The term "machine-readable medium" excludes signals per se.

The input/output (I/O) components 1150 may include a wide variety of components to receive input, provide output, produce output, transmit information, exchange information, capture measurements, and so on. The specific input/output (I/O) components 1150 that are included in a particular machine will depend on the type of machine. For example, portable machines such as mobile phones will likely include a touch input device or other such input mechanisms, while a headless server machine will likely not include such a touch input device. It will be appreciated that the input/output (I/O) components 1150 may include many other components that are not shown in FIG. 11. The input/output (I/O) components 1150 are grouped according to functionality merely for simplifying the following discussion and the grouping is in no way limiting. In various example embodiments, the input/output (I/O) components 1150 may include I/O components 1150. The output components 1118 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1120 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the input/output (I/O) components 1150 may include biometric components 1122, motion components 1124, environmental components 1126, or position components 1128, among a wide array of other components. For example, the biometric components 1122 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 1124 may include acceleration sensor components (e.g., accelerometer), gravitation sensor components, rotation sensor components (e.g., gyroscope), and so forth. The environmental components 1126 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 1128 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The input/output (I/O) components 1150 may include communication components 1130 operable to couple the machine 1100 to a network 1136 or devices 1132 via a coupling 1138 and a coupling 1134 respectively. For example, the communication components 1130 may include a network interface component or other suitable device to interface with the network 1136. In further examples, the communication components 1130 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1132 may be another machine or any of a wide variety of peripheral devices (e.g., a peripheral device coupled via a Universal Serial Bus (USB)).

Moreover, the communication components 1130 may detect identifiers or include components operable to detect identifiers. For example, the communication components 1130 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1130, such as, location via Internet Protocol (IP) geo-location, location via Wi-Fi® signal triangulation, location via detecting a NFC beacon signal that may indicate a particular location, and so forth.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within the scope of embodiments of the present disclosure as represented by the appended claims. The specification and drawings are, accordingly, to be regarded in an illustrative rather than a restrictive sense.

While illustrated in the block diagrams as groups of discrete components communicating with each other via distinct data signal connections, it will be understood by those skilled in the art that the various embodiments may be provided by a combination of hardware and software components, with some components being implemented by a given function or operation of a hardware or software system, and many of the data paths illustrated being implemented by data communication within a computer application or operating system. The structure illustrated is thus provided for efficiency of teaching the present various embodiments.

It should be noted that the present disclosure can be carried out as a method, can be embodied in a system, a non-transitory computer readable medium or an electrical or electro-magnetic signal. The embodiments described above and illustrated in the accompanying drawings are intended to be exemplary only. It will be evident to those skilled in the art that modifications may be made without departing from this disclosure. Such modifications are considered as possible variants and lie within the scope of the disclosure.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or with any suitable combination thereof. For example, a hardware module may include dedicated circuitry or logic that is permanently configured to perform certain operations. For example, a hardware module may be a special-purpose processor, such as a field-programmable gate array (FPGA) or an Application Specific Integrated Circuit (ASIC). A hardware module may also include programmable logic or circuitry that is temporarily configured by software to perform certain operations. For example, a hardware module may include software encompassed within a general-purpose processor or other programmable processor. Such software may at least temporarily transform the general-purpose processor into a special-purpose processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a particular processor or processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, with a particular processor or processors being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the processors, not only residing within a single machine, but deployed across a number of machines. In some example embodiments, the processors or processor-implemented modules may be located in a single geographic location (e.g., within a home environment, an office environment, or a server farm). In other example embodiments, the processors or processor-implemented modules may be distributed across a number of geographic locations.

The invention claimed is:

1. A system comprising:
   one or more computer processors;
   one or more computer memories; and
   a set of instructions incorporated into the one or more computer memories, the set of instructions configuring the one or more computer processors to perform operations, the operations comprising:
   accessing volumetric data corresponding to a digital asset, the digital asset including a plurality of frames represented in a flat format, the flat format representing the plurality of frames arranged in a plurality of buffers, each of the plurality of buffers being assigned a predetermined number of frames;
   receiving camera frustum data for a frame of the plurality of frames;
   determining normal data of the frame is absent from the volumetric data;
   incorporating the normal data into the frame based on the camera frustum data, the normal data usable for providing real-time lighting to illuminate movable geometry in a scene in real time;
   streaming the volumetric data in the flat format directly to a graphical processing unit of a client device without requiring additional operations to be performed by a central processing unit, the graphical processing unit configured to decode and render in parallel each of the plurality of frames arranged in the plurality of buffers; and supporting seeking and scrubbing the frame of the plurality of frames substantially immediately by accessing the frame based on a sequence offset and a frame offset associated with the frame.

2. The system of claim 1, the operations further comprise:
receiving the volumetric data corresponding to the digital asset;
creating a file to represent the volumetric data in the flat format; and
providing the file to a client device for a rendering of the digital asset.

3. The system of claim 2, wherein the volumetric data comprises a volumetric sequence of point clouds, a point cloud including a set of disassociated spatial points representing a 3D object, and wherein the volumetric sequence represents the plurality of frames.

4. The system of claim 3, wherein the rendering in parallel further comprises:
generating, by the graphical processing unit, a procedural instancing for each disassociated spatial point representing a 3D object in the frame; and
performing culling on the plurality of frames in the plurality of buffers.

5. The system of claim 4, the operations further comprise:
rendering, by the graphical processing unit, the decoded plurality of frames at the client device based on the camera frustum data.

6. The system of claim 3, wherein the flat format allows the client device to directly process the file on a graphics processing unit without performing a pre-processing step with respect to the file in real-time during the rendering.

7. The system of claim 1, wherein the operations of receiving, creating, and providing are repeatedly performed such that multiple files are provided to the client device in real time, and wherein the client device is configured to process the multiple files in parallel for rendering.

8. The system of claim 1, wherein the client device is configured to process the plurality of frames in parallel for rendering.

9. The system of claim 1, wherein the plurality of frames arranged in each of the plurality of buffers corresponds to a constant number, wherein the constant number is used to identify a file in the flat format.

10. The system of claim 9, wherein the constant number is determined based on a frame rate of the volumetric data.

11. A non-transitory computer-readable storage medium storing a set of instructions that, when executed by one or more computer processors, perform operations, the operations comprising:
accessing volumetric data corresponding to a digital asset, the digital asset including a plurality of frames represented in a flat format, the flat format representing the plurality of frames arranged in a plurality of buffers, each of the plurality of buffers being assigned a predetermined number of frames;
receiving camera frustum data for a frame of the plurality of frames;
determining normal data of the frame is absent from the volumetric data;
incorporating the normal data into the frame based on the camera frustum data, the normal data providing real-time lighting to illuminate movable geometry in a scene in real time;
streaming the volumetric data in the flat format directly to a graphical processing unit of a client device without requiring additional operations to be performed by a central processing unit, the graphical processing unit configured to decode and render in parallel each of the plurality of frames arranged in the plurality of buffers; and
supporting seeking and scrubbing the frame of the plurality of frames substantially immediately by accessing the frame based on a sequence offset and a frame offset associated with the frame.

12. The non-transitory computer-readable storage medium of claim 11, the operations further comprise:
receiving the volumetric data corresponding to the digital asset;
creating a file to represent the volumetric data in the flat format; and
providing the file to a client device for a rendering of the digital asset.

13. The non-transitory computer-readable storage medium of claim 12, wherein the volumetric data comprises a volumetric sequence of point clouds, a point cloud including a set of disassociated spatial points representing a 3D object, and wherein the volumetric sequence represents the plurality of frames.

14. The non-transitory computer-readable storage medium of claim 13, wherein the rendering in parallel further comprises:
generating, by the graphical processing unit, a procedural instancing for each disassociated spatial point representing a 3D object in the frame; and
performing culling on the plurality of frames in the plurality of buffers.

15. The non-transitory computer-readable storage medium of claim 14, the operations further comprise:
rendering, by the graphical processing unit, the decoded plurality of frames at the client device based on the camera frustum data.

16. The non-transitory computer-readable storage medium of claim 11, wherein the predetermined number of frames is determined based on a frame rate of the volumetric data.

17. A method comprising:
accessing volumetric data corresponding to a digital asset, the digital asset including a plurality of frames represented in a flat format, the flat format representing the plurality of frames arranged in a plurality of buffers, each of the plurality of buffers being assigned a predetermined number of frames;
receiving camera frustum data for a frame of the plurality of frames;
determining normal data of the frame is absent from the volumetric data;
incorporating the normal data into the frame based on the camera frustum data, the normal data providing real-time lighting to illuminate movable geometry in a scene in real time;
streaming the volumetric data in the flat format directly to a graphical processing unit of a client device without requiring additional operations to be performed by a central processing unit, the graphical processing unit configured to decode and render in parallel each of the plurality of frames arranged in the plurality of buffers; and supporting seeking and scrubbing the frame of the plurality of frames substantially immediately by accessing the frame based on a sequence offset and a frame offset associated with the frame.

\* \* \* \* \*